United States Patent
Bemat et al.

(10) Patent No.: US 7,514,816 B2
(45) Date of Patent: Apr. 7, 2009

(54) OUTPUT CURRENT THRESHOLD ADJUSTMENT FOR A POWER SUPPLY

(75) Inventors: Mohamed Amin Bemat, Cypress, TX (US); Hai N. Nguyen, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

(21) Appl. No.: 11/133,122

(22) Filed: May 19, 2005

(65) Prior Publication Data

US 2006/0262464 A1    Nov. 23, 2006

(51) Int. Cl.
*H02J 7/00* (2006.01)
(52) U.S. Cl. .................................................. 307/64
(58) Field of Classification Search .............. 307/64, 307/32, 60
See application file for complete search history.

(56) References Cited

U.S. PATENT DOCUMENTS

| | | | | | |
|---|---|---|---|---|---|
| 4,356,403 | A | * | 10/1982 | Mohat | 307/60 |
| 5,668,417 | A | * | 9/1997 | Wiscombe et al. | 307/64 |
| 5,724,237 | A | * | 3/1998 | Hunter | 363/65 |
| 6,661,119 | B2 | * | 12/2003 | Liu et al. | 307/71 |
| 2005/0067902 | A1 | | 3/2005 | Bemat et al. | |
| 2007/0291519 | A9 | * | 12/2007 | Sadler et al. | 363/65 |

* cited by examiner

*Primary Examiner*—Robert L. Deberadinis

(57) ABSTRACT

A power supply comprises an alternating current-to-direct current converter (ADC) and an input signal adapted to couple to an output signal of another power supply. The output signal is indicative of the operational status of the other power supply. The power supply further comprises logic coupled to the ADC that receives the input signal and causes an output current threshold to be increased when the output signal from the other power supply indicates that the other power supply has experienced a failure.

10 Claims, 5 Drawing Sheets

OUTPUT CURRENT THRESHOLD ADJUSTMENT FOR A POWER SUPPLY

BACKGROUND

Electronic systems typically use a power supply to convert alternating current (AC) voltage to direct current (DC) voltage. The AC voltage may be 120 VAC and the DC voltage is whatever is needed by the electronic system for proper operation (e.g., 3.3 VDC, 5 VDC, etc.). Some types of electronic systems (e.g., server computers) use more than one power supply for redundancy so that if one power supply fails, another power supply can provide the needed current to the load. In redundantly configured power supplies, the output voltage from the supplies may be connected together and, from that point, a single conductor is routed to the load to carry the DC voltage. That single conductor may comprise a wire or a trace on a circuit board.

Some power supplies may have over-current output protection. That is, the power supply's output will automatically shut off if the output current drawn by the load exceeds a particular threshold. When both supplies in a dual, redundant power supply configuration are operating normally, each supply, all else being equal, supplies one-half of the current needed by the load. However, because each supply may have to supply all of the current needed by the load upon a failure of the other supply, each supply typically has its over-current threshold set at approximately the maximum current needs of the load.

With both supplies operating correctly, in general neither supply will be forced to deliver current at or near the over-current threshold, unless the load experiences a short-circuit. In that case, the current demand on each supply will increase until the current output from each supply reaches the over-current threshold. At that point, the supplies will shut down. Because the aforementioned scenario could happen, the power conductor to the load that carries all of the combined current produced by the single power supplies must be large enough to carry the combined maximum current from all supplies. Such a conductor may be considerably large and thus undesirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

By way of an overview, a system in accordance with an embodiment of the invention comprises two power supplies coupled to a load by way of a common conductive pathway. Each supply provides over-current protection by way of a dynamically (i.e., during run-time) adjustable output current threshold. During normal system operation, the threshold of each supply is set at a level less than the current demand of the load (e.g., at half the current demand of the load). Each supply also receives a signal from the other supply that is indicative of the operational status of the other supply. If that signal indicates that the other supply has failed, the remaining operational supply dynamically adjusts its output current threshold to a level sufficient to satisfy the current demand of the load.

Thus, during normal operation, the combined output current thresholds of the power supplies is just sufficient to satisfy the current demand of the load. If one supply fails, the other supply reacts in a way that its output current threshold is still just sufficient to satisfy the current demand of the load. By way of example, assume the load draws 1× current. During normal operation, each supply may have its output current threshold set at 0.5×. If one supply fails, the other supply will increase its output current threshold to 1×. Advantageously, the above noted common conductive pathway to the load need not be rated at more than 1×. The following description provides specific embodiments of the invention as non-limiting examples.

Figure 1:
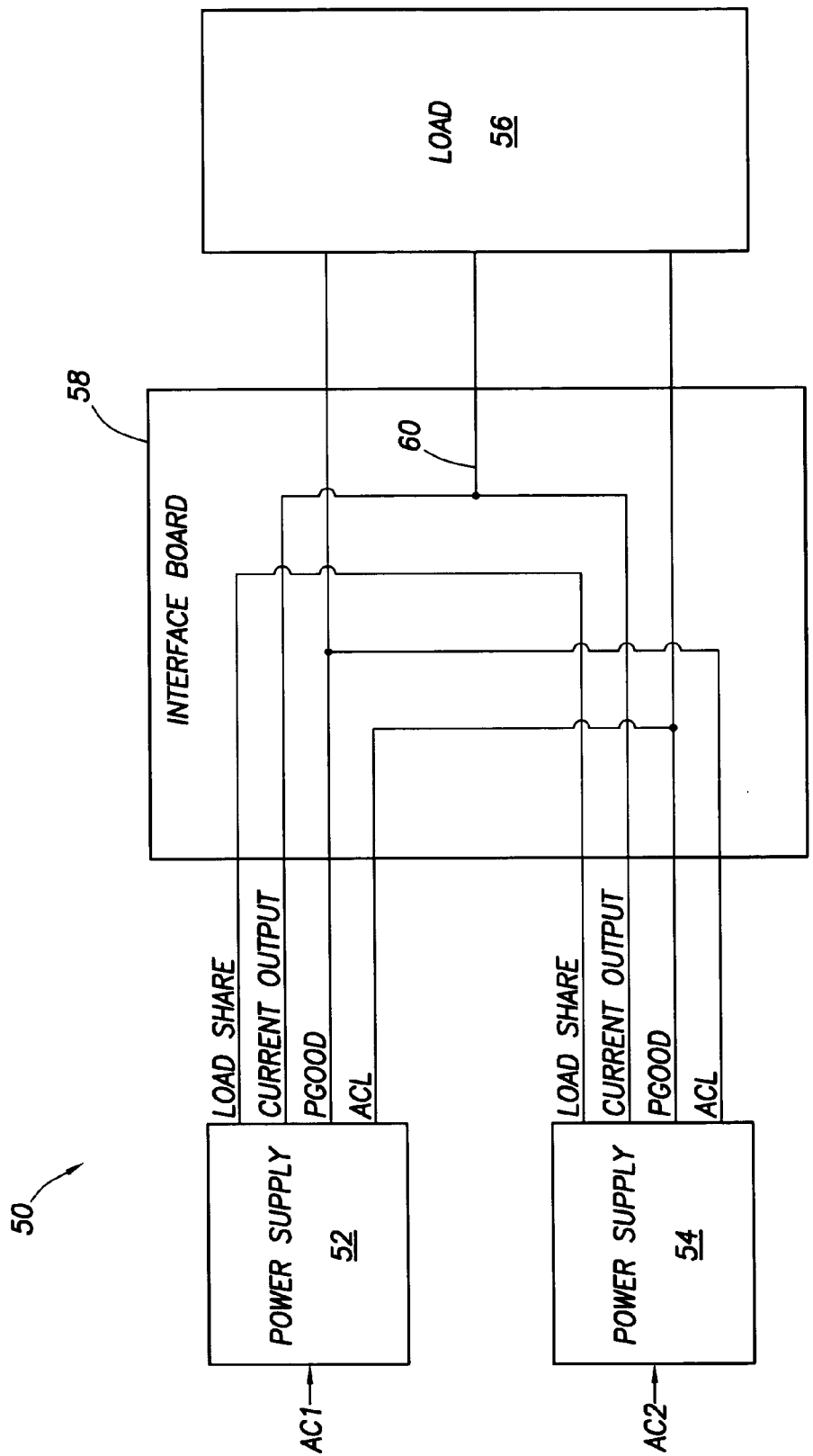
FIG. 1 shows a block diagram of multiple, redundant power supplies coupled to a load by way of an interface board, in accordance with a preferred embodiment of the invention.

FIG. 1 shows an exemplary embodiment of the invention comprising a pair of power supplies 52 and 54 connected to a load 56 by way of an interface board 58. The load 56 may comprise some or all of the circuitry of a computer such as a server. As such, the load 56 may comprise the computer's processor, memory, etc. In other embodiments, the system 50 may comprise any type of electronic system (besides a computer) where the load 56 comprises some or all of the circuitry of such an electronic system.

The power supplies 52, 54 are redundantly configured to provide DC voltage to the load 56. Each power supply receives an AC input feed labeled as "AC1" and "AC2." In the embodiment shown in FIG. 1, the AC input feeds represent separate power feeds. In other embodiments, the same AC power feed can be provided to each power supply.

Each power supply converts the input AC power to DC power and provides DC output current on the conductor labeled "current output." The power supplies are redundantly configured by electrically connecting together the current outputs of the supplies. The combined current on conductive pathway 60 is then provided to the load 56. The conductive pathway 60 may comprise one or more traces on a printed circuit board (PCB) or a wire.

Referring still to FIG. 1, each power supply 52, 54 provides a power good (PGOOD) output signal and an adaptive current limit (ACL) input signal. The PGOOD signal of each power supply indicates whether that power supply is operating correctly. The PGOOD signal may comprise a binary signal. For example, a logic state of "1" for the PGOOD signal of a power supply indicates that that supply is operating correctly. Correct operation may mean that the supply is providing a sufficient output voltage level. Conversely, a logic state of "0" for the PGOOD signal indicates incorrect operation of the power supply. Alternatively, the polarity of the PGOOD signal can be "0" to indicate correct operation and "1" to indicate incorrect operation.

The ACL input signal of each power supply is used to control the operation of the supply as will be discussed below. The PGOOD output signal of each power supply is connected to the ACL input signal of the other supply. As such, each power supply in the embodiment of FIG. 1 receives a signal indicating whether the other supply is operating correctly.

Each power supply also has over-current protection. Thus, if a load were to draw current in excess of a current threshold, the supply's output voltage will automatically be shut down. In the embodiments described herein, the current threshold of each supply's DC output can be adjusted. More specifically, the current threshold of a supply's DC output can be adjusted in accordance with whether the other supply is operating correctly. If the other supply is operating correctly, then each supply only need provide a portion (e.g., one-half) of the current needed by the load and the over-current threshold can be set accordingly. In some embodiments, the over-current threshold may be set at 50% of the maximum current demand of the load (assuming the other supply is providing the other 50%). In other embodiments, each supply can have its over-current threshold set at greater than 50% of the maximum current demand of the load to provide some extra margin. For example, the threshold may be set, in some embodiments, at 65% of the load's current demand. Broadly speaking, the over-current threshold of each supply is normally set at a level that is less than the current demand of the load because it is assumed that the other supply is also supplying current to the load.

Figure 2:
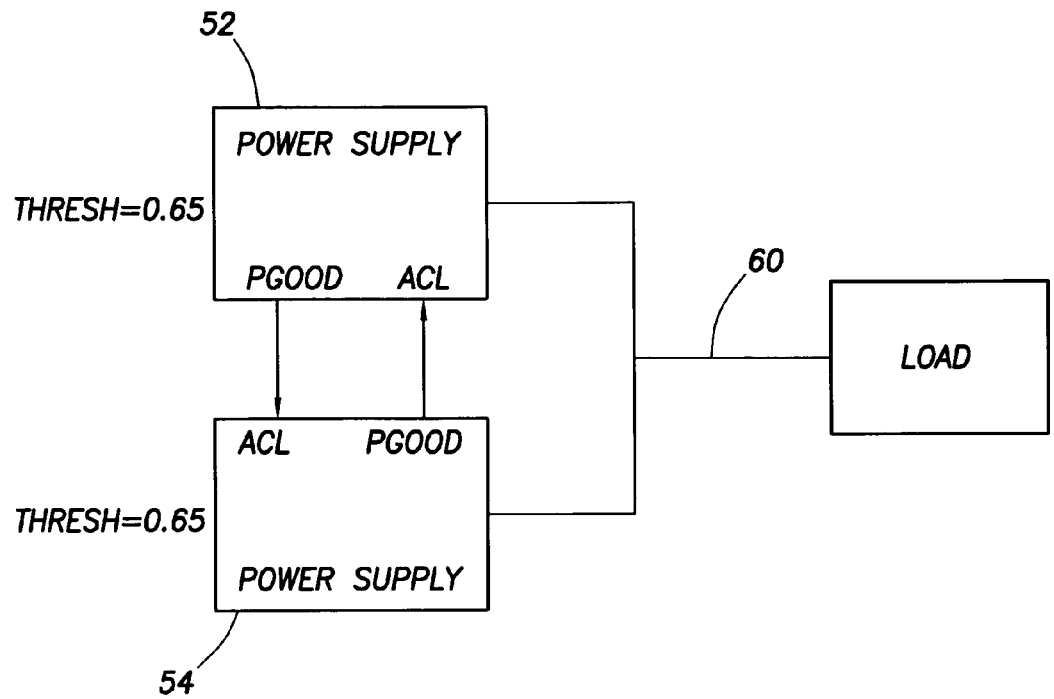
FIG. 2 shows another block diagram of multiple power supplies coupled to a load, the multiple power supplies coupled to each other using signals indicative of each power supply's operational status, in accordance with embodiments of the invention.
Figure 3:
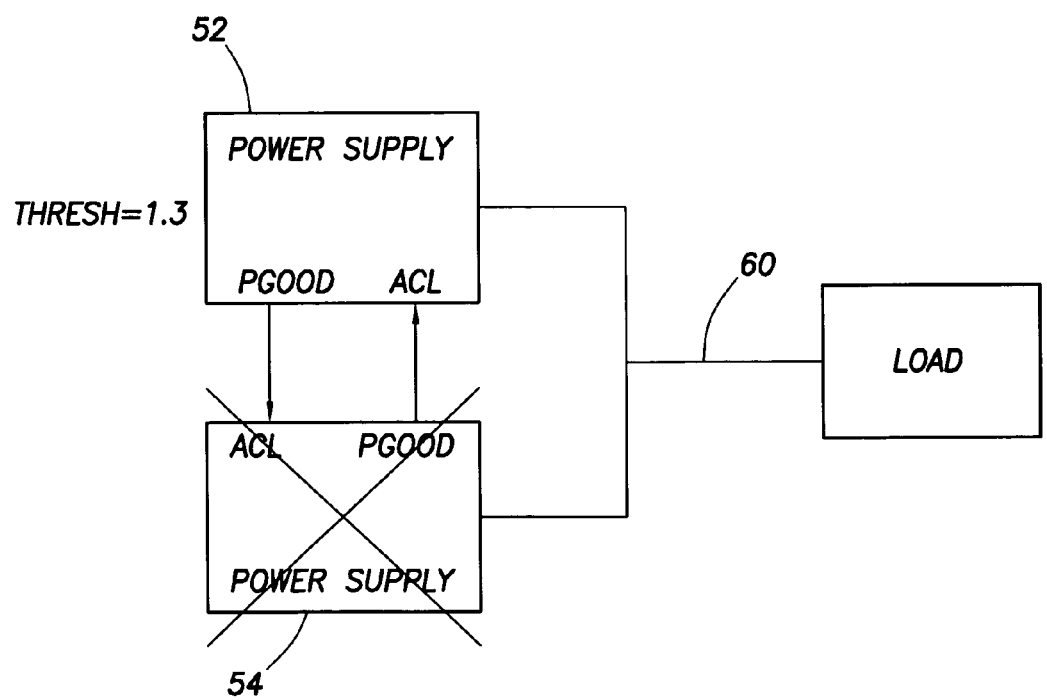
FIG. 3 shows the block diagram of FIG. 2 where one of the power supplies has failed in accordance with embodiments of the invention.

FIGS. 2 and 3 illustrate the use of the PGOOD signals to configure the power supplies. FIG. 2 illustrates that both power supplies are operating correctly and that, accordingly, the over-current threshold (THRESH) of each supply is set at 0.65 times the maximum current demand of the load. With the over-current threshold of each supply set at 0.65 times the maximum current demand of the load, the maximum combined current from the power supplies is 1.3 times the maximum current demand of the load. As such, the conductive pathway 60 in this example, which carries the combined current need only be rated to 1.3 times the maximum current demand of the load.

FIG. 3 illustrates the effect of power supply 54 ceasing to be able to provide power to the load, as indicated by the "X" drawn through the supply to indicate a failure of that supply. Upon failure of supply 54, the PGOOD signal from the failed supply is set to a state to indicate the failure. The other power supply, supply 52, receives the PGOOD signal from the failed supply 54 and, in response to its ACL input signal indicating that supply 54 has failed, supply 52 adjusts its over-current threshold to 1.3 times the maximum current demand of the load. As such, the power supply 52 can continue providing the necessary current to the load. Because, however, the maximum current that the power supplies 52, 54 will provide is 1.3 times maximum current demand of the load (provided exclusively by supply 52 since supply 54 has failed), conductive pathway 60 need only be rated to 1.3 times the maximum current demand of the load.

In either case (normal operation as in FIG. 2 or a failed supply in FIG. 3) the maximum current that can be provided to the load in these examples is 1.3 times the maximum current demand of the load. Moreover, conductive pathway 60 need only be rated for 1.3 times the maximum current demand of the load. This was made possible because each supply is provided information regarding the operational status of the other supply and each supply uses that status information to dynamically set its own over-current threshold. Accordingly, in no situation will the supplies be capable of providing more than 1.3 times the maximum current demand of the load.

Of course, the values of 0.5, 0.65 and 1.3 in the examples above are illustrative of only some, but not all, of the possible embodiments of the invention. Moreover, the values listed above can be varied as desired to suit the needs of particular applications.

Figure 4:
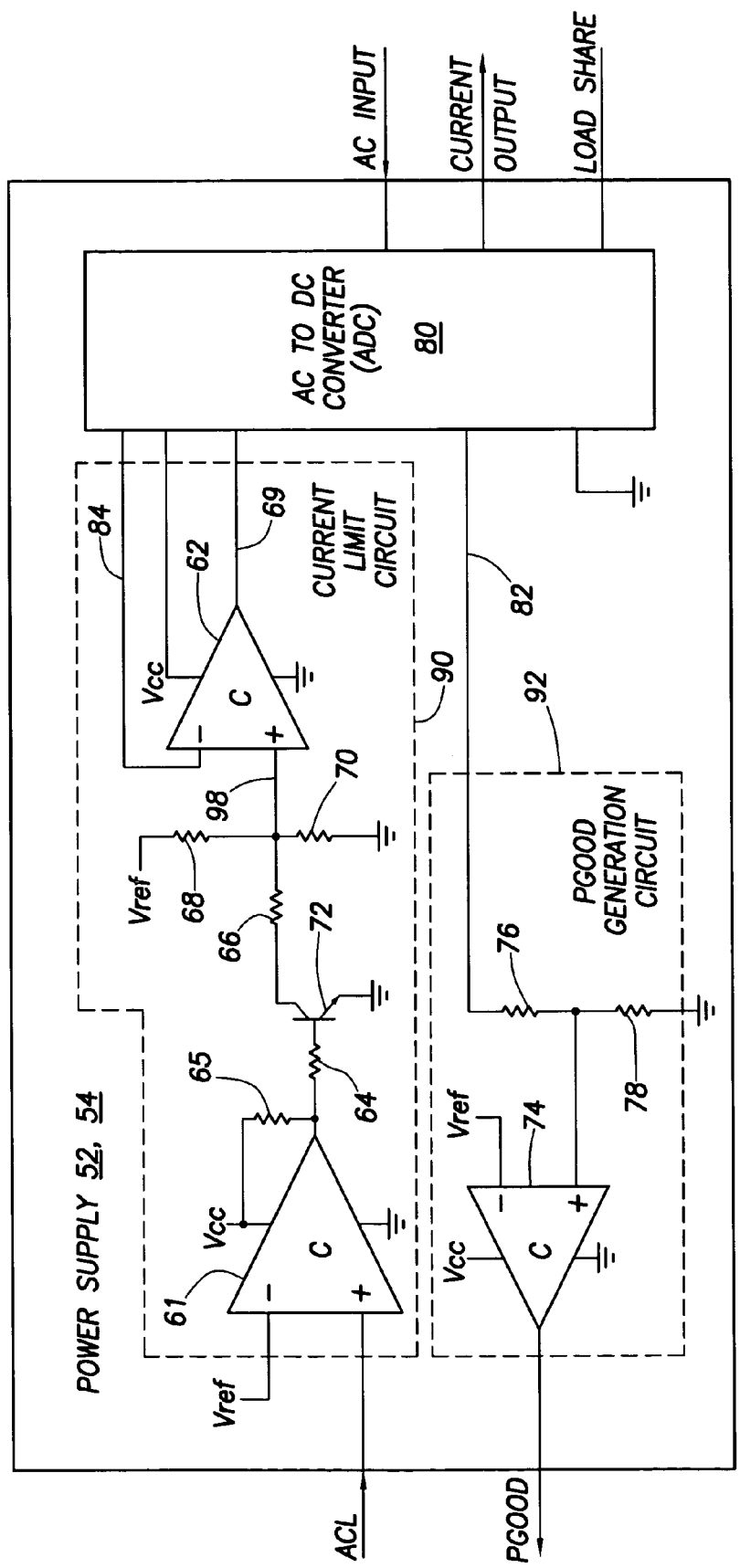
FIG. 4 shows a circuit schematic of a power supply in accordance with embodiments of the invention.

FIG. 4 illustrates at least a portion of the circuitry contained in each power supply 52, 54. As shown, the circuitry comprises an AC-to-DC converter (ADC) 80, a current limit circuit 90, and a PGOOD generation circuit 92. The ADC 80 receives AC input power and produces DC output power to provide to a load via the output labeled "current output."

In normal operation mode, both of the power supplies 52, 54 are operating properly, and thus the ACL signal that is input into the circuit 90 of each power supply is high. When the ACL signal is high, circuit 90 of each power supply maintains a current threshold level that is below the full current demand of the load (e.g., each power supply has a threshold level of 0.65 times the current demand of the load). During normal operation, the circuit 90 of each power supply sends a high signal to the ADC 80, indicating that no action is to be taken. If the load experiences a short circuit and draws more current from a power supply than the amount permitted by the power supply's current threshold level, the circuit 90 sends a low signal to the ADC 80, causing the power supply to shut down.

Conversely, if one of the power supplies 52, 54 ceases to operate properly, then only one power supply is left to provide current to the load. In such a case, the ACL signal supplied to the properly functioning power supply is low, indicating the unavailability of the other power supply. When the ACL signal is low, the circuit 90 of the functioning power supply alters the current threshold of the power supply. For example, if each of the power supplies 52, 54 has a current threshold level of 0.65 times the current demand of the load and power supply 52 fails, then power supply 54 may raise its current threshold level to 1.3 times the current demand of the load. Unless the load experiences a short circuit and draws more current from the power supply 54 than the amount permitted by the power supply's current threshold level, the circuit 90 of the power supply 54 sends a high signal to the ADC 80, indicating that no action is to be taken. Otherwise, the circuit 90 sends a low signal to the ADC 80, causing the power supply 54 to shut down.

The current limit circuit 90 comprises comparators 61 and 62, resistors 64, 65, 66, 68, 70, and transistor 72. Although the transistor 72 is shown to be an npn bipolar junction transistor, any appropriate transistor may be used. The circuit 90 receives an ACL signal that is coupled to the PGOOD output of a separate power supply as explained above. As such, the ACL input signal is indicative of the proper operational status of another power supply. In at least some embodiments, a logic high ACL input may indicate that the other power supply is operating properly, and a logic low ACL input may indicate that the other power supply is not operating properly or has not been switched on. The ACL's input signal is provided to the positive (+) input of the comparator 61. The ACL input signal then is compared to a reference voltage signal (provided to the comparator's negative input) by the comparator 61. If the reference voltage is higher than the ACL input signal in the embodiment of FIG. 4, the comparator 61 will output a logic low signal. Conversely, if the ACL input is higher than the reference voltage, the comparator 61 will output a logic high signal. Thus, in cases where both power supplies are functioning properly, the signal output from comparator 61 will be high. In cases where one of the power supplies is not functioning properly, the signal output in the comparator 61 of the properly functioning power supply will be low. In some embodiments, a resistor 65 may be coupled between the Vcc of the comparator 61 and the output of the comparator 61 to pull up the output voltage.

If the output of the comparator 61 is high, indicating that both power supplies are functioning properly, then the transistor 72 is activated or "turned on." If the transistor 72 is turned on, the signal 98 supplied to the positive (+) input of the comparator 62 is determined by the reference voltage, the effective parallel combination of resistors 66, 70, and the value of the resistor 68. The reference voltage and the values of the resistors 66, 68, 70 may be manipulated as desired in order to adjust the signal 98 is indicative of the current threshold for the power supply. In some embodiments, the values of the resistors 66, 68, 70 and the value of the reference voltage may be such that the current threshold signal 98 indicates a current threshold of about 0.65 times the current demand of the load.

Signal 84 comprises a voltage level that is proportional to the actual load current being supplied to the load by the power supply. As long as the voltage of signal 84 is less than the current threshold signal 98, the ADC 80 is supplying a current to the load that is below the current threshold for the power supply. In this case, no action is necessary. Accordingly, the signal 69 provided by the comparator 62 to the ADC 80 is high, indicating that no action is to be taken by the ADC 80. However, if the load experiences a short circuit, then the current demand placed on the ADC 80 may be substantially increased, and the signal 84 may reflect this increase. In the case that the signal 84 is increased to a level greater than that of the current threshold signal 98, the current demand on the power supply is greater than the current threshold of the power supply. As such, the comparator 62 sends a low signal to the ADC 80, indicating the ADC 80 is to stop providing current to the load and that the power supply is to shut down.

Conversely, if the output of the comparator 61 is low, indicating that one of the power supplies is not functioning properly, then the transistor 72 of the properly functioning power supply is deactivated or "turned off." If the transistor 72 is turned off, then the resistor 66 has a negligible or non-existent effect on the current threshold signal 98 supplied to the positive input of the comparator 62. Instead, the current threshold signal 98 is determined by the values of the resistors 68, 70 and the reference voltage. In some embodiments, the current threshold signal 98 indicates that the current threshold for the power supply is about 1.3 times the current demand of the load. Provided that the load does not demand a current greater than the current threshold of the power supply, the signal 84 is lower than the current threshold signal 98. As such, the comparator 62 provides a high signal to the ADC 80, indicating that no action is to be taken. However, in the case of a short circuit on the load, the load may demand an increase in current from the power supply. If the increase in current provided by the power supply is such that the signal 84 becomes greater than the current threshold signal 98, the comparator 62 provides a low signal to the ADC 80, causing the ADC 80 to stop providing current to the load and further causing the power supply to shut down.

The PGOOD generation circuit 92 comprises a comparator 64 and resistors 76 and 78. The circuit 92 receives a signal 82 which indicates the level of the DC output voltage to the load. Output voltage level signal 82 is provided through a voltage divider formed by serially-connected resistors 76 and 78 to the non-inverting input of comparator 74. A voltage reference is provided to the comparator's inverting input and thus used to compare to the divided down version of the output voltage signal 82. If the divided down output voltage signal 82 is greater than the reference voltage provided to the comparator 74, then the PGOOD output signal is asserted to a logic high state indicating proper power supply operation; otherwise, the PGOOD signal is asserted to a logic low state indicating improper power supply operation.

Figure 5:
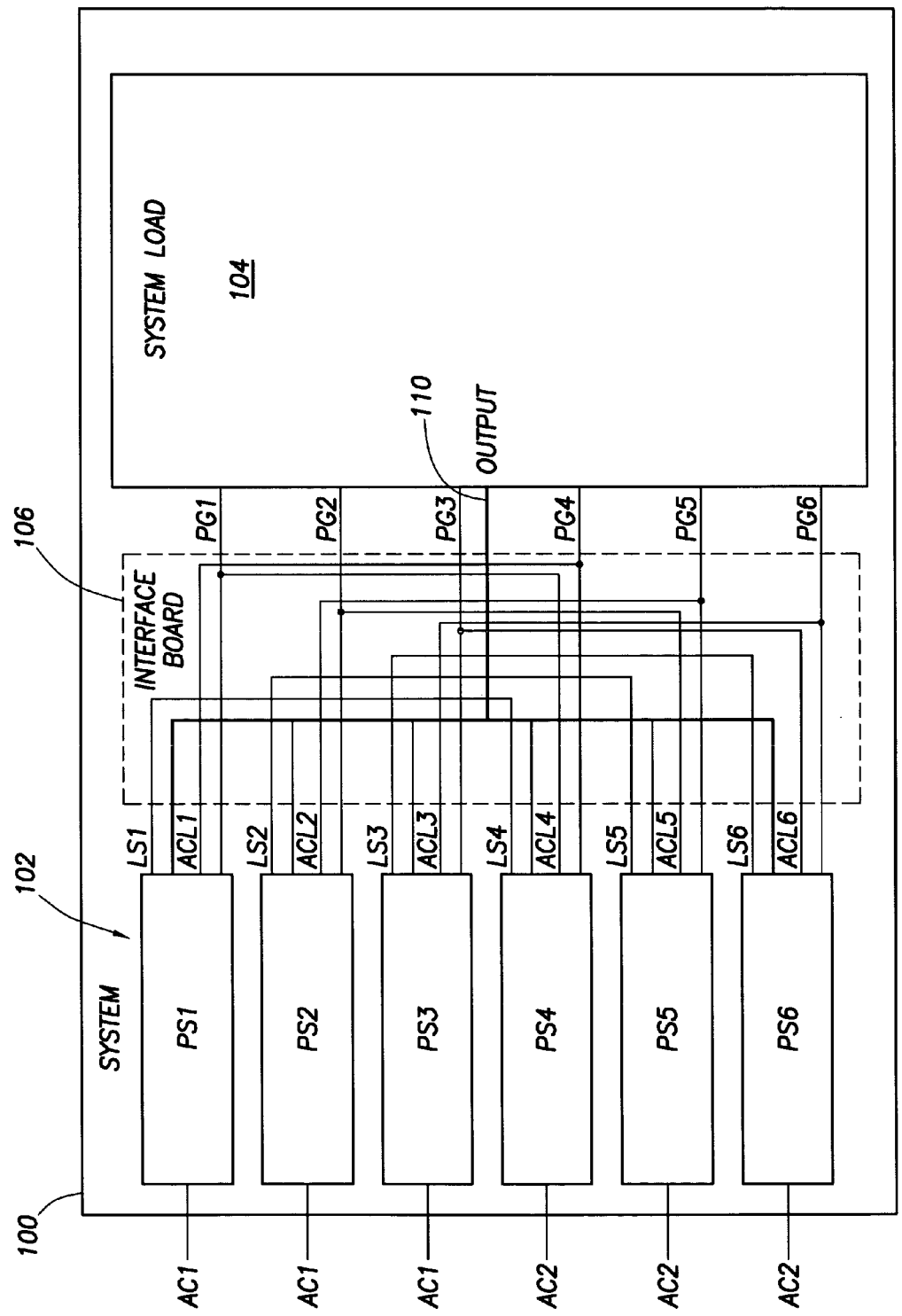
FIG. 5 shows a block diagram of six redundant power supplies coupled to a load, in accordance with embodiments of the invention.

FIG. 5 shows an embodiment of the invention comprising more than two power supplies. The embodiment of FIG. 5 comprises six power supplies 102 designated as "PS1," "PS2," "PS3," and so on. The output current of the various power supplies is wired together and provided on a single conductor 110 via interface board 106 to the system load 104. In the embodiment of FIG. 5, the power supplies PS1, PS2 and PS3 are provided with AC power from a single AC source (AC1). The power supplies PS4, PS5 and PS6 are provided with AC power from a different AC source (AC2). The power supplies 102 are grouped into pairs to provide power redundancy to the load 104. PS1 is grouped with PS4. PS2 is grouped with PS5 and PS3 is grouped with PS6. For each group, the PGOOD output (labeled in FIG. 5 as "PG1," "PG2," etc.) of each supply is connected to the ACL input of the other supply. The power supplies of each pair have differing sources of AC power.

For each power supply in a group, the PGOOD signal indicates the operational status of the other power supply. If such other power supply fails, the operational power supply will, in response to a change in the status of the PGOOD signal, increase its output current limit to compensate for the failure. For example, if PS1 fails, the status of the PG1 signal changes. Because ACL4 is coupled to PG1, the status of ACL4, which is provided to PS4, also changes. In response, PS4 increases its output current limit to compensate for the failure of PS1.

Figure 6:
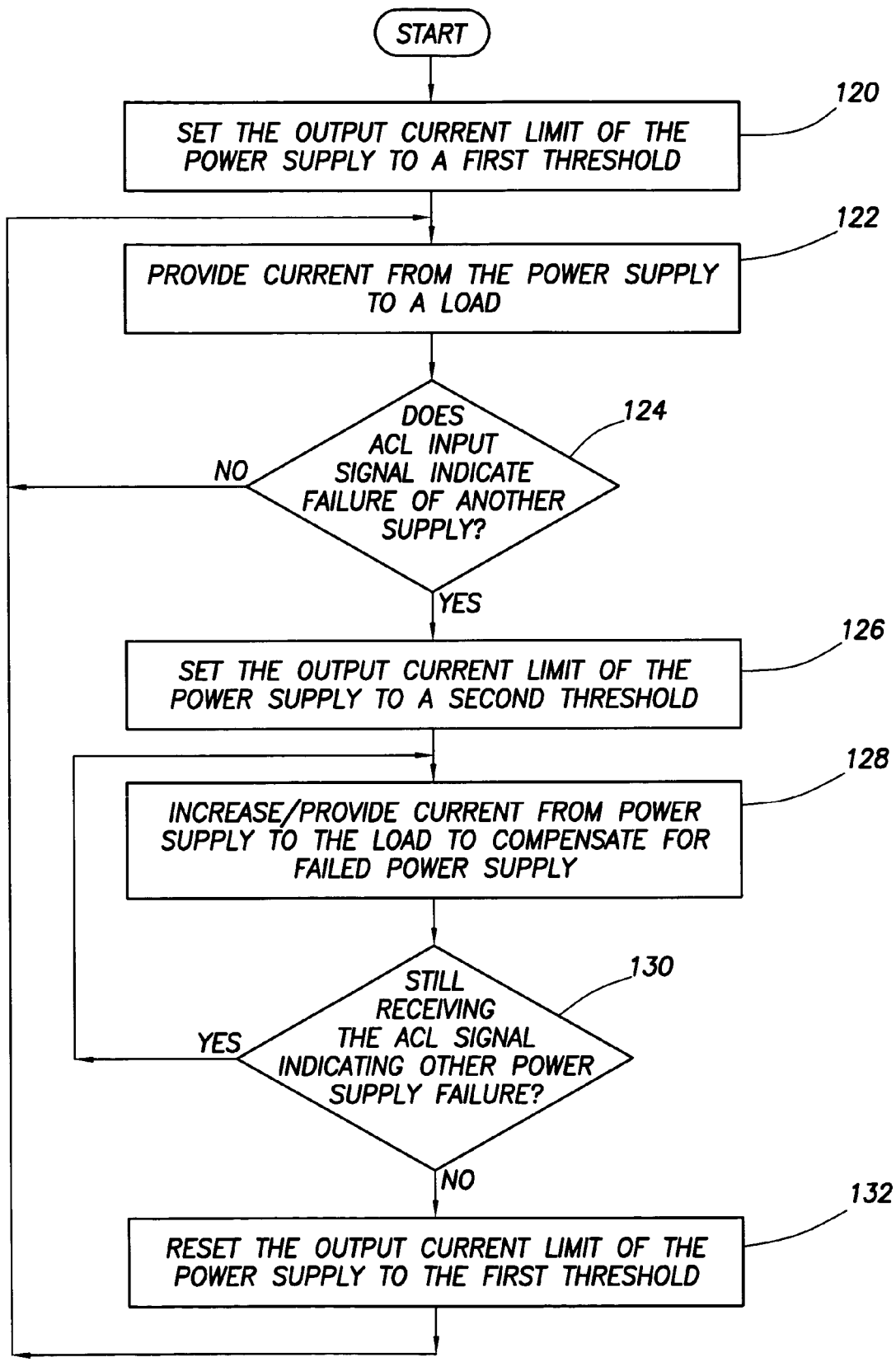
FIG. 6 shows a flow diagram of a method used to adaptively adjust the output current limit of the power supplies of FIGS. 1-5, in accordance with embodiments of the invention.

FIG. 6 shows a method embodiment comprising actions 120-132. The method illustrated in FIG. 6 is performed by each of the power supplies in a system with redundantly configured power supplies, such as those embodiments described above. The order of at least some of the actions can be varied from that shown in FIG. 6. At 120, the method comprises setting the output current limit of the power supply to a first threshold. At 122, current is provided from the power supply to a load. At 124, the method comprises determining whether the ACL input signal indicates the failure of another power supply. If the ACL does not indicate the failure of another power supply, the method continues by providing current from the power supply to the load (block 122). However, if the ACL does indicate the failure of another power supply, then the method comprises setting the output current limit of the still operational power supply to a second threshold which is greater than the first threshold (block 126). At 128, the method comprises increasing the current from the power supply to the load, as required by the load, to compensate for the failed power supply.

The method further comprises determining whether the power supply is still receiving the ACL signal indicating that the other power supply has failed (block 130). If the power supply is still receiving the ACL signal indicating the other power supply has failed, then the method comprises continuing to provide a power supply to the load to compensate for the failed power supply (block 128). However, if the power supply is not still receiving the ACL signal indicating the other power supply has failed (e.g., the ACL signal has changed to a state indicative of the other supply repaired or being replaced with an operational supply), then the method comprises resetting the output current limit of the power supply to the first threshold (block 132). At 122, the power supply then may resume providing current from the power supply to the load as required by the load. The method thus causes a power supply to adjust its output current limit upon a detected failure of another supply and upon a transition back to an operational state, thereby permitting a failed supply to be a "hot removal" from the system (i.e., while the rest of the system remains operational).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    first and second power supplies coupled to each other and to a load, said first and second power supplies providing current to the load over a common conductive pathway;
    wherein the first power supply comprises an adjustable current output limit that is adjusted based on the operational status of the second power supply; and
    wherein the operational status of the second power supply is indicated to the first power supply by way of a first status signal, and the system further comprises third and fourth power supplies coupled to each other and to the load, said third and fourth power supplies providing current to the load over the common conductive pathway, and wherein the third power supply comprises an adjustable current output limit that is adjusted based on a second status signal provided by the fourth power supply indicating the operational status of the fourth power supply, and wherein the second status signal is not provided to the first or second power supplies and the first status signal is not provided to the third or fourth power supplies.

2. The system of claim 1, wherein the first power supply increases its limit if the second power supply fails.

3. The system of claim 2, wherein the first power supply decreases the limit if the second power supply is no longer failed or is replaced with an operational supply.

4. The system of claim 1, wherein the first power supply provides an output signal to the second power supply indicative of the operational status of the first power supply.

5. The system of claim 1, wherein the first power supply and the second power supply are provided with alternating current from different sources.

6. The system of claim 1, wherein the conductive pathway is rated at a level approximately equal to a maximum current demand of the load.

7. A method, comprising:
    a first power supply setting an output current limit of the first power supply to a first value;
    the first power supply receiving a first signal indicative of a failure associated with a second power supply;
    in response to receiving the first signal indicating the failure associated with the second power supply, the first power supply setting the output current limit of the first power supply to a second value that is higher than the first value;
    a third power supply setting an output current limit of the third power supply to a third value;
    the third power supply receiving a second signal indicative of a failure associated with a fourth power supply; and
    in response to receiving the second signal indicating the failure associated with the fourth power supply, the third power supply setting the output current limit of the third power supply to a fourth value that is higher than the third value;
    wherein the first, second, third and fourth power supplies supplying current over a common conductive pathway to a load; and
    wherein the first signal is not provided to the third or fourth power supplies and the second signal is not provided to the first or second power supplies.

8. The method of claim 7 further comprising ceasing to receive the first signal indicating the failure and, in response, resetting the output current limit to said first value.

9. The method of claim 7 further comprising the first power supply asserting a second signal to the second supply indicative of the operational state of the first supply.

10. The method of claim 9 further comprising, in response to receiving the second signal indicating a failure associated with the first power supply, the second power supply increasing its output current limit.

* * * * *